United States Patent
Aguayo et al.

Patent Number: 5,283,943
Date of Patent: Feb. 8, 1994

[54] AUTOMATED ASSEMBLY APPARATUS

[76] Inventors: Kermit Aguayo, 807 E. Oltorf, Austin, Tex. 78704; Khanh Tran, 10801 Barnhill Dr., Austin, Tex. 78758

[21] Appl. No.: 938,414

[22] Filed: Aug. 31, 1992

[51] Int. Cl.$^5$ .................... B23P 21/00; G06F 15/46
[52] U.S. Cl. ........................ 29/701; 29/706; 29/720; 364/479
[58] Field of Search ............... 29/407, 701, 702, 703, 29/705, 706, 707, 709, 711, 714, 715, 716, 717, 718, 719, 720; 364/474.13, 131, 132, 136, 183, 468, 478, 479

[56] References Cited

U.S. PATENT DOCUMENTS

| | | |
|---|---|---|
| 4,564,913 | 1/1986 | Yomogida et al. |
| 4,706,187 | 11/1987 | Arai et al. |
| 4,870,591 | 9/1989 | Ciciarelli et al. |
| 4,870,592 | 9/1989 | Lampi et al. |
| 5,010,634 | 4/1991 | Uemura et al. ............... 29/720 X |
| 5,029,095 | 7/1991 | Kenik et al. |
| 5,125,149 | 6/1992 | Inaba et al. ............... 29/720 X |

FOREIGN PATENT DOCUMENTS 49203  3/1992  Japan ..................... 29/720

OTHER PUBLICATIONS

Advertisement, "Scan," *Circuits Assembly*, p. 49 (Oct. 1991).
Brochure, "Mydata Automation," Surface Mount System TP9, 1–15 (1991).
Brochure, "SMT—The Next Generation," Zevatech PPM 9 (Publication Date Unknown).
Brochure, "Panasert Software," Panasonic Factory Automation (Publication Date Unknown).

*Primary Examiner*—Timothy V. Eley
*Attorney, Agent, or Firm*—Arnold, White & Durkee

[57] ABSTRACT

A method and apparatus for assembling multiple component products using automated assembly equipment having predetermined locations for loading of components or component compartments. The invention includes a component identifier which reads indicia of component identity from components or component compartments, and a location indicator which indicates a proper location for loading and identified component or component compartment. The invention also contemplates a sensor that senses the placement of components or component compartments in the locations of the assembly machine, and a disabling device which disables the assembly machine if components or component compartments are misplaced.

28 Claims, 10 Drawing Sheets

AUTOMATED ASSEMBLY APPARATUS

BACKGROUND OF THE INVENTION

The present invention relates to improving processes of automated assembly.

Several decades ago, standard manufacturing procedures used purely manual assembly for the production of nearly all multicomponent articles. These old techniques necessarily involved total human supervision over every step of the manufacturing process. By today's standards, these techniques were slow and inefficient, however they were not without merit. Intensive human attention was beneficial in that there was a very low occurrence of obvious defects, such as putting a component in the wrong place. For example it was unlikely that the head of a toy clown would be positioned at the end of the clowns foot rather than atop its neck.

Over time, technological advances facilitated increasing portions of manufacture through the use of machines and robots. Generally, these systems operate by using one or more mechanical assemblers that retrieve components from a place of storage and affix them into their proper place in the product. For instance, in placing wheels on a toy car, a mechanical assembler might retrieve a wheel from a bin of wheels and affix it to the right front axle. A second wheel would then be retrieved and affixed to the left front axle, and so on until all four wheels were in place. After affixing the wheels, the assembler might retrieve other components from other bins and affix them in place.

These automated manufacturing techniques allowed for dramatic increases in speed and efficiency, but unfortunately also created some problems. One major problem occurred because the machinery could not determine whether or not it was doing its job correctly. Therefore, if a machine was making a mistake, it would incorrectly assemble hundreds or thousands of products before an operator might notice the mistake and correct the problem. The cost of repairing or replacing duplicated mistakes is clearly excessive. Furthermore, repaired products usually suffer from decreased quality and reliability.

Some modern technologies have reduced the problem of mistake duplication. For example, automated manufacturing processes can include intermittent tests or checks. The check or test can be done by a human operator or by the machine itself. In either case, after a mistake is detected, mass duplication is prevented by quickly correcting the process or interrupting production. Unfortunately, intermittent testing increases costs and slows productivity, so it is not universally used. Even if intermittent testing were always used, it would not perfect the automated assembly process because at least one mistake must be made before it can be detected. The costs of mistakes are generally more significant than they might appear. First, a mistake incurs the cost of its own rework or replacement. Second, there is an efficiency cost caused by the down time required after a mistake is detected. Therefore, it is prudent to attempt to prevent assembly mistakes rather than correct those which have already occurred.

Many mistakes occurring in modern automated manufacturing are caused by human error in the set up of the assembly process. Specifically, assembly operators are prone to load components in the wrong places because modern articles of manufacture have increasingly large numbers of components which are often visually similar. To prevent these set up errors, well trained operators are usually very careful and deliberate in their work. However, no degree of care can totally prevent mistakes. Furthermore, careful and deliberate behavior results in very slow set up which reduces productivity.

The aforementioned problem is particularly acute in the assembly of electronic products, where components are especially numerous and physically similar. In this field, the components are small and vary only slightly, if at all, in appearance and physical dimension, and yet can have disparate electrical properties. Misplacement of electrical components usually results in the failure of the final assembly. These components are often identified only by alphanumeric combinations stamped on their surface, when surface area permits. However, surface mountable components often do not have sufficient printable area, and are identified only by markings on tubes or reels which carry the components. To compound matters, modern electronic assemblies are assembled by machines called pick and place assemblers. These assemblers are designed to retrieve components directly from industry standard reels or tubes. Therefore, the operator's primary visual contact is with the package and not the component.

Electronic products typically require several dozen different components. In a pick and place system, each tube or reel of components must be loaded in a specific place. Given the similarity of visual appearance of the reels and tubes, it is extremely easy for an operator to load a pick and place location with the wrong component. This type of error can occur during setup or replenishing of depleted components.

SUMMARY OF THE INVENTION

The present invention overcomes many of the above-noted problems encountered in automated assembly. By ensuring the proper loading of assembly equipment, the invention minimizes the following undesirable events: 1) creation and duplication of mistakes, 2) loss of productivity due to down time when correcting mistakes, and 3) loss of productivity due to excessive set up times.

The present invention contemplates a system for assembling multiple component products using automated assembly equipment. The system is comprised of three primary components. The first primary component is an automated assembly machine. The phrase "automated assembly machine" refers to any combination of equipment that is used to assemble any product. The type of assembly machine contemplated assembles a product with components which it automatically retrieves from designated compartments. The word "compartment" refers to any storage vessel, or manner of storage of the product's components including piling, stacking or other unenclosed manner of storage.

The second primary component is a component identifier, and the third primary component is a machine location indicator.

The system of the present invention includes a machine which assembles parts using components retrieved from a plurality of compartments located at a corresponding plurality of locations, each compartment being located according to a type of component stored within the compartment. A component identifier is provided that identifies a type of component stored in each compartment by analyzing indicia of the components or component compartments. Finally, the invention includes at least one location indicator, which is responsive to the component identifier, and which produces an indication signal of the corresponding location of each component compartment or component after the type of component has been identified.

The invention may also use compartment sensors which sense the presence or absence of a compartment in a compartment location. If a misplaced compartment is sensed, the invention includes an error signal generator, and a disabling device which disables the assembly machine when an error is indicated. In a preferred embodiment, the component identifier comprises an optical reader, and the indicia of the components comprise optically readable indicia, such as a bar code. In addition, the location indicator preferably comprises individual visual indicators which correspond to each location.

The invention also contemplates a method of operating an automated assembly machine to insure proper loading of components or component compartments into locations of the machine.

DETAILED DESCRIPTION

Figure 1:
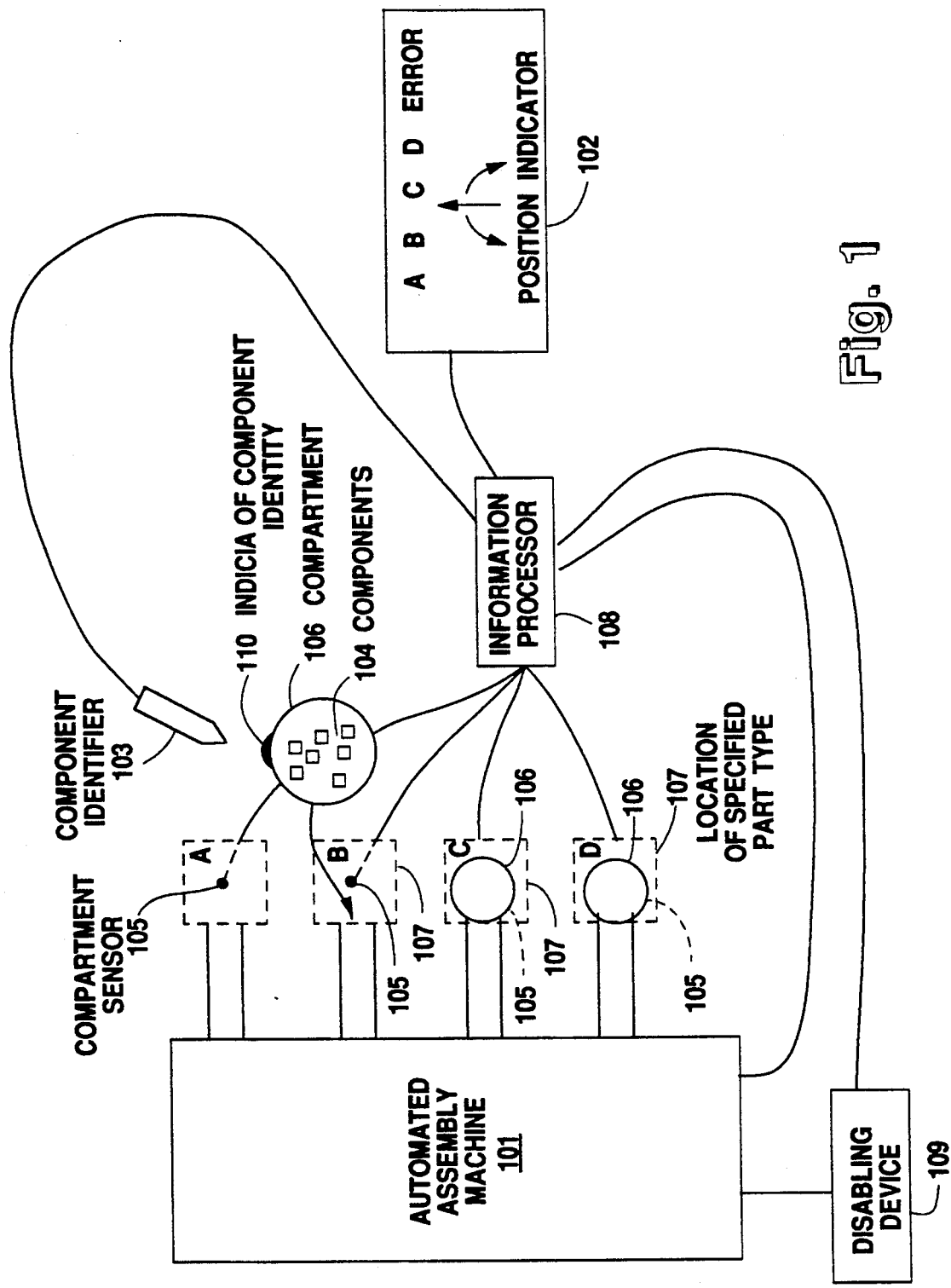
FIG. 1 is a block diagram of an automated assembly apparatus, in accordance with the present invention.

Referring to FIG. 1, presented is a diagram showing the elements of a developed assembly system of the type contemplated by this invention. Conceptually, the invention may be described as comprising three major elements: Automated assembly machine 101, Component identifier 103 and Position indicator 102.

The current invention requires the use of Automated assembly machine 101, which is representative of any automated system that operates in the contemplated manner. The contemplated assembly machine is one that identifies product components according to their storage location. Therefore, when retrieving a component, such a machine 101 does not search for components. Rather, the assembly machine retrieves a component from a location where the component should be stored. If the correct type of component is not in that location, then an error will occur. Accordingly, in order to operate without error, the assembly machine 101 requires components to be positioned in specific locations.

Automated assembly machine 101 may retrieve components from any location 107. Many products of automated assembly require hundreds of different components and therefore hundreds of locations. FIG. 1 shows only four locations 107, however the invention contemplates an assembly machine 101 that uses any number of locations. Each location 107 is a holding place for a predetermined but not necessarily different, type of component. Components may be held in a location in any manner acceptable to the automated assembly machine 101. Conventionally, components are compartmentalized, that is housed or held together in some way such as in tape and reel or tube feeding. However, depending on the machine and the product of manufacture, components might be arranged or simply piled together. For exemplary purposes, FIG. 1 shows components 104, held in compartments 106, positioned in locations 107. Finally, the components 104 should have indicia of their specific type. Such indicia could be a marking or feature of the components or the compartments that is specifically unique to a type of component.

The second major component of the invention is component identifier 103. The component identifier 103 serves two primary functions. First, it acquires information concerning the type of component held in a compartment. Second, it passes the information along to position indicator 102. In one embodiment, component identifier 103 is a device that identifies components by optically or magnetically reading indicia accompanying the components or indicia of the components themselves. Such a device would then transfer the information to the position indicator 102.

The third major element of a three element system is the position indicator 102. The position indicator 102 may be any indication that informs the machine operator of the correct location of identified components. The indication may be visible, audible or detectable by any human or artificial means. In a simple configuration, the position indicator 102 may inform the machine operator of a symbol (number, letter or otherwise) that is indicative of a location. For example, FIG. 1 shows locations 107 labeled as A, B, C and D. If an identified device belongs in location D, the position indicator 102 points to letter D. A more useful configuration employs a visual indication at the site of the location. For example, if after identification the invention determines that components belong in location D, then a blinking light adjacent location D would guide the machine operator to properly place the components.

Typically, an automated assembly process begins with the assembly machine having no components loaded. Therefore, referring to FIG. 1, at the beginning of the assembly process no components 104 or compartments 106 are positioned in a location 107. The machine operator would begin the process of loading the assembly machine by identifying a compartment or group of components. That is to say that the machine operator uses component identifier 103 to identify the first type of component. The component type is then compared with reference information that allows for the determination of the proper location 107 for the identified components. For purposes of a three element system, this comparison and determination may take place either in the component identifier 103 or in the position indicator 102. Furthermore, the information can be physically transferred from the component identifier 103, to the position indicator 103 in any known way of data transmission. For example, hard wire, radio frequency or infrared communications are all acceptable options. Additionally, the data may be in any reliable data format such as 8 bit parallel transmission or RS232 serial transmission.

After the proper location 107 has been determined, it is conveyed to the machine operator. The operator will then load the first component type and move on to the next, repeating the above steps until the machine is fully loaded.

From a practical perspective, the current invention can also be described as comprising four major elements. The first three elements are identical to those discussed above. Referring to FIG. 1, the fourth element is information processor 108 that serves as a medium between all parts of the invention that must communicate with one an.

The information processor 108 serves as a medium between all other elements of the invention. Information processor 108 has the following communications capabilities: 1) it understands any relevant message that any of the other elements might generate, and 2) it is capable of generating any relevant message in a readable format for any other applicable element. Information processor 108 is also able to store and process information performing comparisons and computations as necessary. It is contemplated that the information processor will comprise a standard computer, such as an IBM personal computer or compatible, and peripheral input-output circuits as necessary.

The information processor 108 may use any known method to physically communicate with the other elements in the invention. It is contemplated that cost and necessity will govern the choice of communication. For example, where a small scale production is involved cost factors may dictate the use of hard wiring between the information processor 108 and the other elements of the invention. However, where the production is done on a large scale, hard wiring may be logistically difficult, therefore dictating the use of radio, infrared or other non-wire communication. Furthermore, when using information processor 108, any data format can be used given allowance for the nature and flexibility of the input/output circuitry and programming.

Typically, in a four element system, an automated assembly process begins with the assembly machine having no components loaded. Therefore, at the beginning of the assembly process no components 104 or compartments 106 are positioned in a location 107. The machine operator begins the process of loading the assembly machine by identifying a compartment or group of components. That is to say that the machine operator uses component identifier 103 to identify the first type of component 104. The component identifier 103 then transfers the component type to the information processor 108. The component identifier 103 may transfer this information without performing any computations or processing because the information processor 108 performs those tasks. The information processor 108 then determines the proper location 107 of the identified components using preprogrammed information in addition to the data provided by component identifier 103. Next, the information processor 108 informs the position indicator 102 of the position that should be indicated. Once again, information processor 108 performs all necessary computations and processing such that position indicator 102 is accommodated.

After the proper location 107 has been determined, it is conveyed to the machine operator. The operator then loads the first component type and move on to the next, repeating the above steps until the machine is fully loaded.

The three element embodiment contrasts with the four element embodiment both physically and conceptually. The four element embodiment may broadly be described as having a central information processor 108 which is designed to accommodate all other elements of the invention. The information processor 108 serves to prompt, interpret, compute, process and transfer information as necessary. In contrast, the three element embodiment distributes the functions of the information processor among the other elements. It is further contemplated that hybrid embodiments might also become preferable. A hybrid embodiment would involve information processing functions occurring both at the central information processor 108 and at the peripheral elements. Such an embodiment could realize speed and efficiency advantages in complex or large assembly situations.

Thus far FIG. 1 has been used to illustrate two embodiments comprising the minimum necessary elements for use of the invention. However, the current invention may include many additional features which aid in the perfection of the automated assembly process. The enhancement features discussed in this section apply to both the three element embodiment and the four element embodiment.

The current invention contemplates the use of a disabling device 109 which operates to prevent the operation of the assembly machine 101 until all components 104 or compartments 106 have been loaded in their proper location 107. The device 109 acts to disable the assembly machine 101 prior to loading, and to enable the machine 101 after it is determined that all compartments 106 have been loaded in their proper locations 107.

In one embodiment the disabling device 109 comprises a relay. In the three element embodiment, the relay is responsive to each applicable element, including these enhancements, individually. In the four element embodiment, the relay is responsive to the information processor 108. Since the information processor 108 is responsive to all elements, the relay can respond to any applicable situation in the process.

Compartment sensor 105 enhances as verification that the identified components 104 or compartments 106 have been placed in the indicated location. The addition of compartment sensors 105 amends the operation of the invention such that the machine operator will be alerted of an error if a compartment 106 is placed in a location 107 other than that which was indicated.

Compartment sensor 105 comprises any device that can sense the presence of the applicable compartments 106 or components 104. A preferred embodiment contemplates compartment sensor 105 as a pressure sensitive device such as a limit switch, or the like. Generally, it is contemplated that compartment sensor 105 may comprise devices which are sensitive thermally, electrically, optically, magnetically, or chemically.

Most machine operators are humans rather than other machines. Therefore, the component loading process can falter due to occasional unavoidable erratic behavior of an operator. For example, after identifying a compartment 106 of components 104, an operator could become unavoidably distracted by an event in the factory. On returning from the distractive episode, the operator may mistakenly confuse the identified compartment 106 with another and therefore load the machine improperly. The loading timer minimizes problems of this nature by limiting the acceptable amount of time between component identification and component or compartment positioning. When using the loading timer operation of the invention occurs as follows: 1) machine operator uses component identifier 103 to identify component 104 or compartment 106, 2) position indicator 102 advises the machine operator of the proper position for the identified component 104, 3) if the components are correctly positioned within a specified time (t0) the procedure continues uninterrupted, 4) if the components are not correctly positioned within time t0, then the machine operator is alerted of an error and the loading procedure is halted until the component identifier 103 is used to identify the components or compartment again.

In one embodiment, the time, t0, is greater than t1 where t1 is an estimation of time necessary to load a compartment after identification. In another preferred embodiment t0 is greater than t1 but less than t2 where t2 is an estimation of the amount of time required to load a compartment after identification given an intervening distraction. For example, t0 may be approximately 15 seconds.

The loading timer feature may be used with any embodiment of the current invention. However, it is most useful when used in an embodiment that employs compartment sensors 105. When compartment sensors 105 are used, the loading timer is automatically deactivated as soon as an identified compartment is properly positioned. The timer is then reactivated at the time of the next component identification. If the loading timer feature is used without the compartment sensors 105 then the machine operator must verify the positioning of each compartment before the expiration of the time t0.

Figure 2:
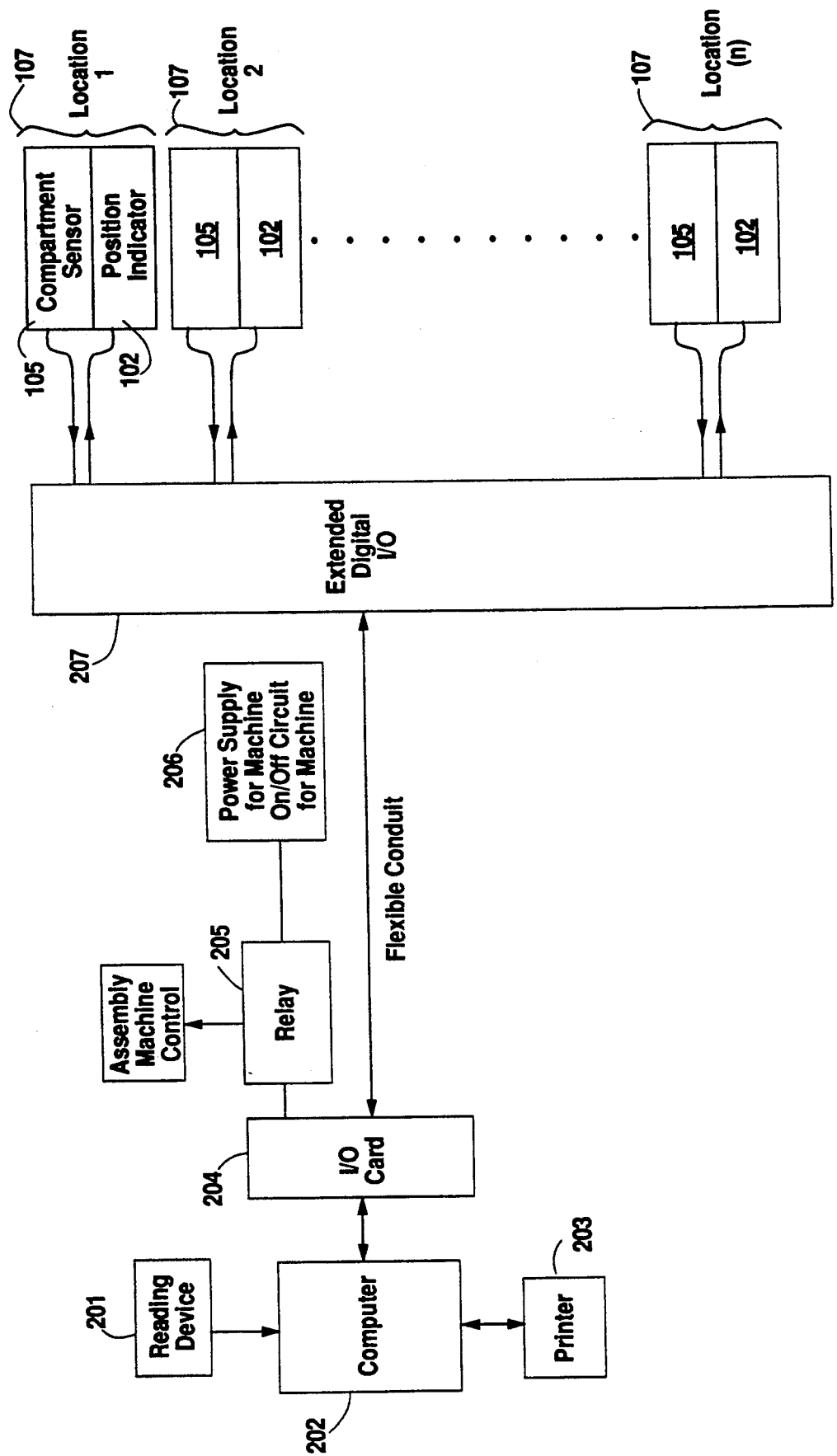
FIG. 2 is a block diagram of a portion of the electronic control circuitry of the apparatus of FIG. 1.

Referring now to FIG. 2, presented is a block diagram of a preferred embodiment of the electrical and electronic portion of the invention. Reading device 201 is used as a component identifier. Computer 202 serves as the controller of the system following method instructions from software of the current invention. Printer 203 makes hard copies of data and information available to users. I/O card 204 is used to avail internal computer signals to extended digital I/O 207. Relay 205 serves as a disabling device, with power supply 206 shown for use with assembly machines that do not have electrical control lines. Extended digital I/O (EDIO) 207 is a circuit that facilitates communication between the computer 202 and the sensing devices 105 and the position indicators 102. EDIO 207 functionally operates primarily as a coding and decoding stage that enables communication between the computer 202 (having few signals brought external by the I/O card 204) and the sensing devices and position indicators (possibly having hundreds of signals). The sensing devices 107 serve as compartment sensors and position indicators 102 visually alert the machine operator of a specific loading location.

Using this embodiment, the current invention operates as follows: computer 202 is pre-loaded with software and all pertinent data concerning the relevant assembly processes. The machine operator begins an assembly session by entering, into the computer, certain information. At a minimum the information must includes some identification of the product to be produced. In this way the computer 202 can determine what devices will be used and the respective locations of those devices. Other information that may be entered is 1) the machine operator's identification, a security code or the like.

After completing the foregoing, computer 202, disables the assembly machine using relay 205. Next, using I/O card 204 as an intermediary, computer 202 instructs extended digital I/O (EDIO) 207 to poll all sensing devices 105. If there are compartments in any of the loading locations 107, the computer 202 instructs the machine operator to remove them. That instruction will be continually urged until a poll of the sensing devices reveals that all loading locations 107 are empty.

Once the invention has determined that the assembly machine has no compartments loaded, the loading phase will begin. The computer 202 then prompts the machine operator to use reading device 201 to identify a compartment. The operator then scans a compartment and waits for the computer's response. If the scan was unsuccessful the machine operator will be prompted to repeat it. If the scan was successful the computer 202 will determine the proper location of the identified compartment. Using I/O card 204 and EDIO 207, computer 202 will then indicate the proper location by causing the activation of a position indicator adjacent to the loading location. Computer 202 then focuses on the sensing devices 105. If the indicated sensing device does not sense a compartment within 15 seconds, then computer 202 prompts for new identification (checking for operator distraction). If any sensing device 105, other than the one indicated, senses a compartment, then the computer instructs the machine operator to remove the detected compartment (checking for misplacement of the compartment). If the sensing device 105 associated with the correct location senses a compartment within 15 seconds then the computer 202 prompts the machine operator to scan another compartment.

With one exception, the second and all subsequent compartments are handled in the same way as the first. The exception relates to the decision concerning checking for misplacement of the compartment. In the second or subsequent iterations there will be one or more properly placed compartments already intact. It follows that one or more sensing devices, other than the one associated with the indicated location, will sense that a compartment is present. Therefore, the computer 202 will only indicate that a compartment is misplaced if any sensing device, other than one associated with the indicated location or one that is associated with a location that has already been loaded properly, senses a compartment.

After all compartments are properly loaded, the computer 202, through I/O card 204, enables the assembly machine and production will begin. The computer 202 again focuses on the sensing devices 105. During production, one or more compartments are likely to become empty, at which time any automatic assembly machine will cease operating. By necessity, the machine operator will remove an empty compartment. As soon as any compartment is removed, a sensing device 105 will so indicate and the computer 202 will become aware. In response the computer 202 will disable the assembly machine through use of relay 205. The computer 202 will then ensure that replacement compartments are positioned properly using the same scan (identify) and indicate steps described above. (note in this mode of operation the computer will not require that all locations are emptied before proceeding).

When production is complete, the computer will have, and be able to print the following data, for example: 1) the operator identification, 2) the number of each type of component that was consumed, 3) the elapsed time, 4) the date of product manufacture, 5) the assembly part number, and 6) the assembly description.

Reading device 201 may be, for example, a bar code scanner. For example, type 9570, 9720 or 1545 bar code wedge readers, available from the Intermec Corporation, are acceptable. The scanner attaches to the computer 202 through a serial port, keyboard or radio link. Given the use of a bar code scanner, it is preferred that indicia 110 (FIG. 1) is a bar code identification.

Computer 202 may be, for example, an IBM PC AT or compatible personal computer. Printer 203 may be, for example, an Okidata Microline 320 printer. I/O card 204 may be, for example, a Xescan 48-bit digital I/O card. This 8 bit I/O card is available from Xetel Corporation of Austin, Texas, as part number 42-001035-0628#. Relay 205 may be, for example, a Grayhill 70G-ODC5. These digital output modules are used to switch AC and DC loads from logic signal levels. EDIO 207 is shown in more detail in FIG. 3. EDIO 207 comprises: a chip select 301, a control signal fanout 302, a reset circuit 303, a data bus fanout 304 and a sensor/indicator communications circuit 305.

According to an exemplary embodiment, Sensor/Indicator communications circuit (SICC) 305 sends data to as many as three hundred and eighty-four indicators 102 and receives data from as many as three hundred and eighty-four sensors 105. More or less indicators can be accommodated without departing from the scope of the invention. SICC 305 has bidirectional communication with the data bus fanout circuit 304 via four sets of data lines, 1D, 2D, 3D and 4D, each eight bits in width. Additionally, SICC 305 receives four sets of five bit wide control signals, 1CTL, 2CTL, 3CTL and 4CTL, from control signal fanout 302. Lastly, SICC 305 receives sixteen bits of chip select data from chip select 301.

Figure 3:
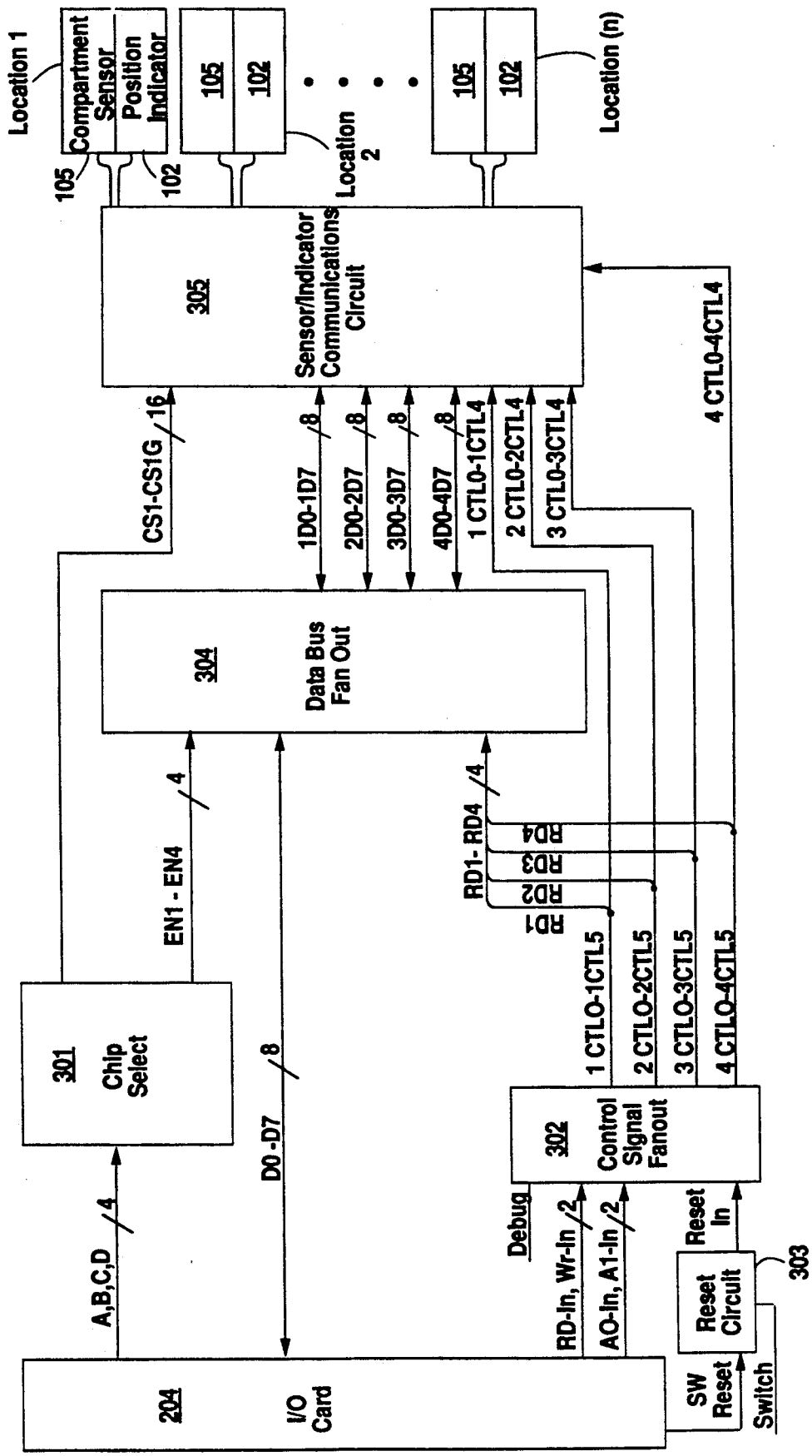
FIG. 3 is a block diagram of the extended digital I/O circuit used in the circuitry of FIG. 2.
Figure 4:
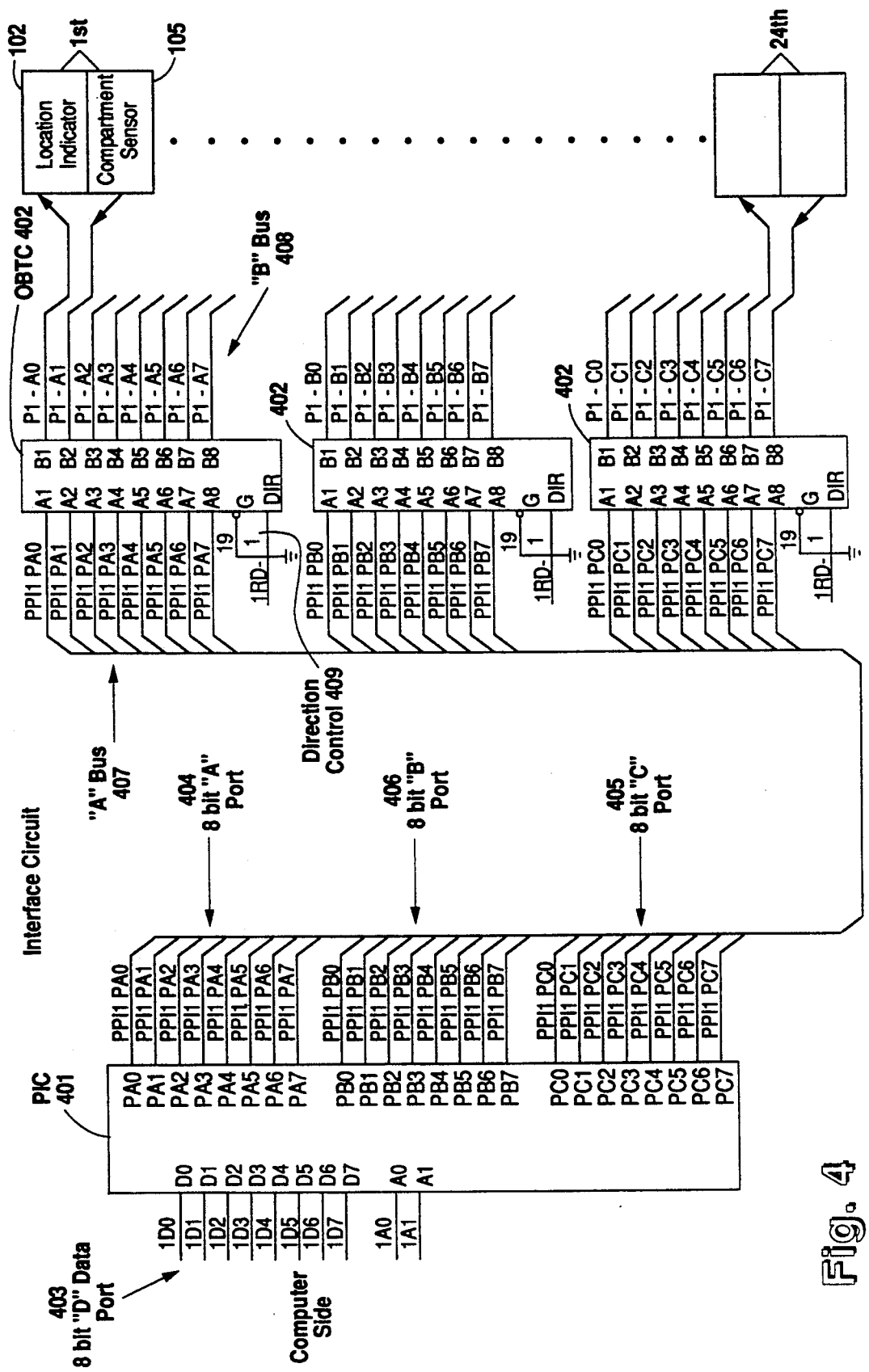
FIG. 4 is a detailed schematic of the interface circuit used in the circuitry of sensor/indicator communications circuit of FIG. 3.

Referring to FIG. 4, presented is one of sixteen interface circuits which comprise the SICC 305. Each interface circuit is minimally comprised of one Mitsubishi M5L8255AP peripheral interface chip (PIC) 402, and three Texas Instruments SN74ALS645 octal bus transceiver chip's (OBTC) 402. The PIC 401 is used to transfer data back and forth between the computer side and the peripheral side. Referring also to FIG. 3, the computer side refers to everything to the left of the SICC 305. Therefore, computer side signals comprise all lines connecting the SICC 305 to chip select 301, Data bus fanout 304, or Control signal fanout 302. More specifically computer side lines are CS1 through CS16, 1D0 through 1D7, 2D0 through 2D7, 3D0 through 3D7, 4D0 through 4D7, 1CTL0 through CTL4, 2CTL0 through 2CTL4, 3CTL0 through 3CTL4 and 4CTL0 through 4CTL4. The peripheral side refers to everything right of SICC 305. Therefore, the peripheral side all signals going out to position indicators 102 and all signals coming in from any compartment sensors 105.

Each interface circuit has twelve lines on the peripheral side. Using these twelve lines, each interface circuit can interact with 48 peripheral elements, twenty-four location indicators 102 and twenty-four compartment sensors 105. This is accomplished by connecting each peripheral line to both a location indicator 102 and a compartment sensor 105. Given this configuration, at any one time, an interface circuit can either read information from the compartment sensors 105 or write information to the location indicators 102.

OBTC 402 has an A bus 407 and a B bus 408 and a direction control 409. When the direction control 409 is held at a logic low, the data from B bus 408 is transferred to A bus 407. Therefore, when data must be read from the compartment sensors 105, the direction control 409 must be at a logic low. Furthermore, when the direction control 409 is held at a logic high, the data from A bus 407 is transferred to B bus 408. Therefore, when data must be written to the location indicators 102, the direction control 409 must be at a logic high.

There are three OBTC 402 chips in each interface circuit, each requiring an identical direction control signal. Each SICC circuit requires sixteen interface circuits and thereby sixteen times three or forty-eight OTBC 402 chips. Since each OTBC 402 chip requires a direction control signal, a total of 48 direction control signals is required to support the OTBC 402 chips. There is an RD-IN signal which originates at I/O card 204 and terminates at Control signal fanout 302. This RD-IN line is the signal source of all OBTC 402 chip direction control lines. This single line cannot drive 48 inputs so control signal fanout 302 is used to boost and divide the signal. Control signal fanout 302 uses the RD-IN signal to produce eight logically identical signals, 1RD, 2RD, 3RD, 4RD, RD1, RD2, RD3, and RD4. Each one of these signals is used to drive six OTBC 402 chips, which make up two interface circuits.

Twenty-four bidirectional data lines exit the PIC 401 in three groups of eight. Twenty-four bidirectional data lines enter the OBTC 402 chips in three groups of eight. The PIC 401 uses the same read signal as the corresponding OBTC 402 chips in order that data can be shuttled back and forth.

The basic operation of PIC 401 allows for the following six data transactions to occur, one at a time: 1) data from A port 404 transferred to D port 403, 2) data from B port 406 transferred to D port 403, 3) data from C port 405 transferred to D port 403, 4) data from D port 403 transferred to A port 404, 5) data from D port 403 transferred to B port 406, 6) data from A port 403 transferred to C port 405. Any one of the six transactions can be selected by varying the logic level on the following five of the PIC 401 input lines: A0, A1, /RD, /WR, and /CS. Signals A0, A1, /RD and /WR originate at I/O card 204 and are divided and amplified by control signal fanout 302 so that one of each signal can be connected to each of the 16 PIC 401 chips in the SICC 305. There are sixteen different CS signals, one for each PIC 401, all originating from chip select 301. Chip select 301 derives the sixteen /CS signals using four signals, A, B, C, and D originating at I/O card 204.

When the invention is running, the hardware of the SICC operates as follows. Take for example the situation where the invention activates one specific location indicator 102 of the possible three hundred and eighty-four. Suppose that the specific location indicator 102 is the 1st location indicator and that the interface circuit in FIG. 4 is the 16th interface circuit. The computer will generate the proper eight bit data word to eventually be placed on B bus 408, which will cause the lighting of the desired position indicator. That data is sent along signal lines D0–D7. Data bus fanout 304 fans out the data so that it arrives at the input of the proper PIC 401 chip (this is assured by the working of the chip select circuit, explained later). The computer also generates control signals RD-IN, WR-IN, A0-IN, A1-IN such that after passing through control signal fanout 302 the control signals that arrive at all PIC 401 chips instruct that data from D data port 403 should be transferred to A port 404. The computer then chooses a single PIC 401 to enable so that only the first location of the sixteenth PIC 401 will activate. To accomplish this, the computer selects the sixteenth PIC 401 by using lines A, B, C, and D in binary coded decimal form. A, B, C, and D are decoded in chip select 301 and only the sixteenth PIC 401 is enabled.

A similar procedure is followed to determine the condition of any specific compartment sensor 105. In this procedure however, all control signals must be set, then the computer can read in the data from a specific OBTC 402 and determine if any compartment sensor 105 is activated. The invention will often be required to monitor the compartment sensors 105 for activation. In this case each of the OBTC 402 chips will be polled, one at a time. The computer speed is so fast that in real time a polling of all 48 OBTC chips occurs substantially simultaneously.

Figure 5:
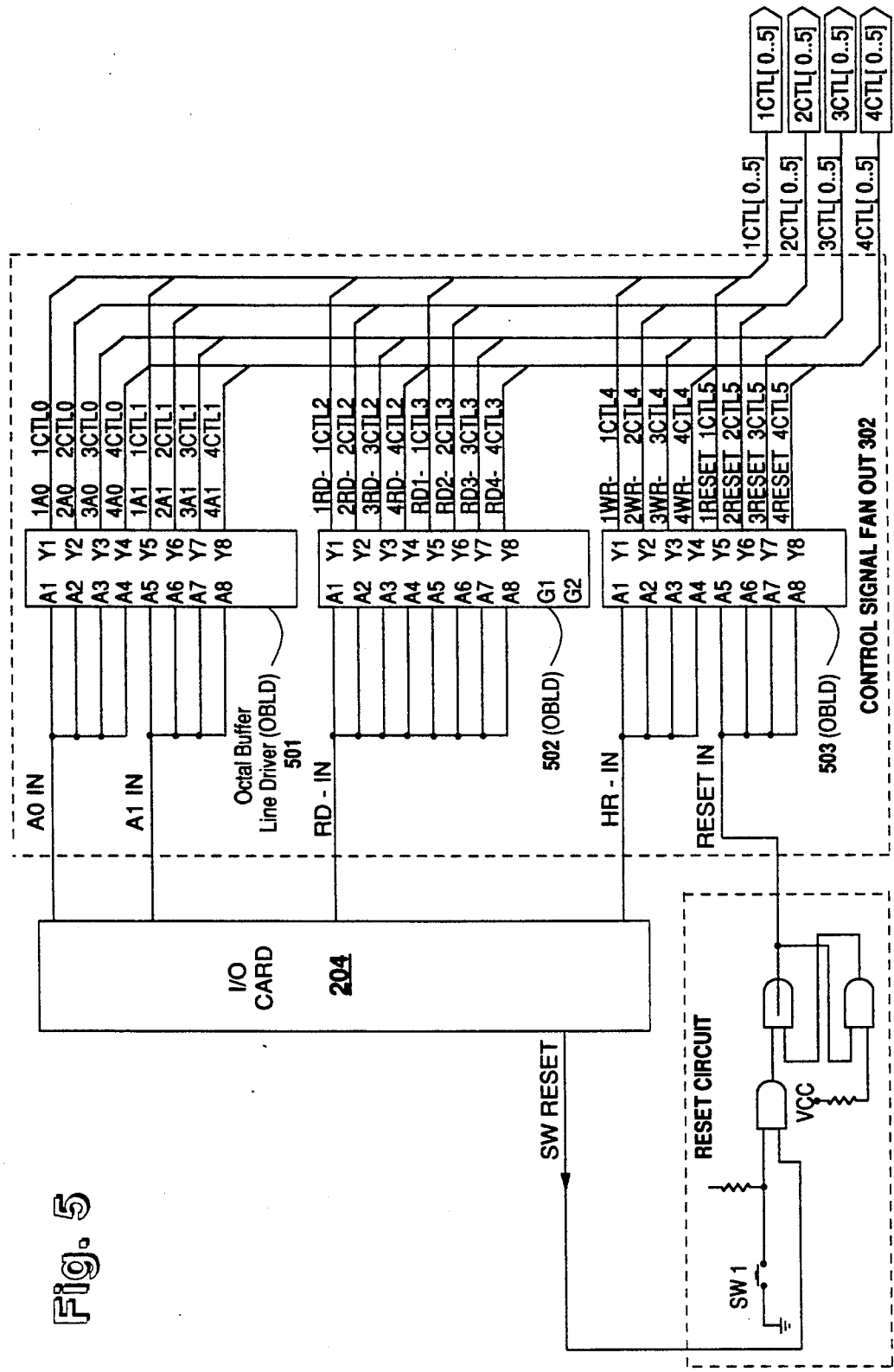
FIG. 5 is a detailed schematic of the control signal fanout circuit and reset circuit used in the circuitry of FIG. 3.

Referring to FIG. 5, control signal fanout circuit 302 is used to divide and amplify five control signals originating at I/O card 204. Control signal fanout circuit 302 is comprised of three octal buffer line drivers (OBLD's). These devices may be obtained through Texas Instruments and other sources as part number 74ALS541. Each OBLD is capable of taking a weak input signal and giving it significant driving and sinking capability. Once a signal has emerged from an OBLD, it is capable of driving several other devices.

Reset circuit 303 allows the invention to be reset through software or by pushing a button.

Figure 6:
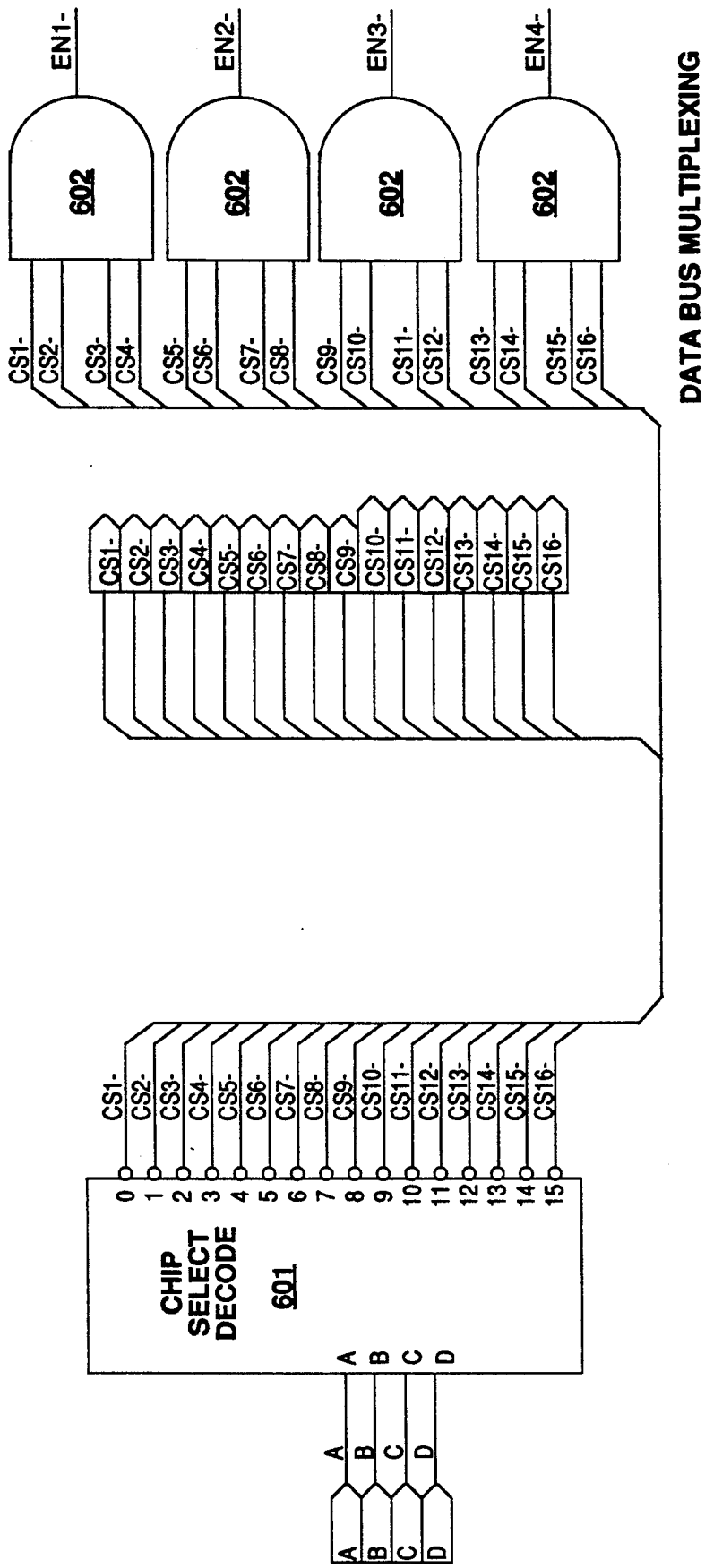
FIG. 6 is a detailed schematic of the chip select circuitry used in the circuitry of FIG. 3.

The main function of chip select 301 is to decode binary coded decimal of bits A, B, C and D into /CS1 through /CS 16. Referring to FIG. 6, presented is a diagram of the chip select circuit. The circuit uses four quad input AND gates 602 and one 74LS154 four to sixteen line decoder (decoder chip). Both the AND gates and the 74LS154 are readily available from a number of manufacturers including Texas Instruments.

The decoder chip 601 has signals A, B, C and D at its input. These signals originate at I/O card 204, are in the form of a binary coded decimal (BCD). The decoder chip 601 has sixteen outputs, one corresponding to each of the sixteen PIC chips in the SICC circuit 305. The decoder chip 601 decodes the binary coded decimal so that none or one of the sixteen decoder chip 601 outputs are active. Since each decoder chip 601 output is connected to a PIC chip select line, there can be up to one PIC chip operating at one time.

Quad input AND gates 602 receive their inputs from the output of decoder 601. The function of the AND gates is to generate enable signals to be used in the Data bus fanout circuit 304. As will be seen later, the data bus fanout circuit operates using four octal bus transceiver. In order to prevent a bus conflict, only one bus transceiver can be enabled at any time. Using the AND gates 602 as shown in FIG. 6 allows enablement of the bus transceiver which corresponds to selected PIC.

Figure 7:
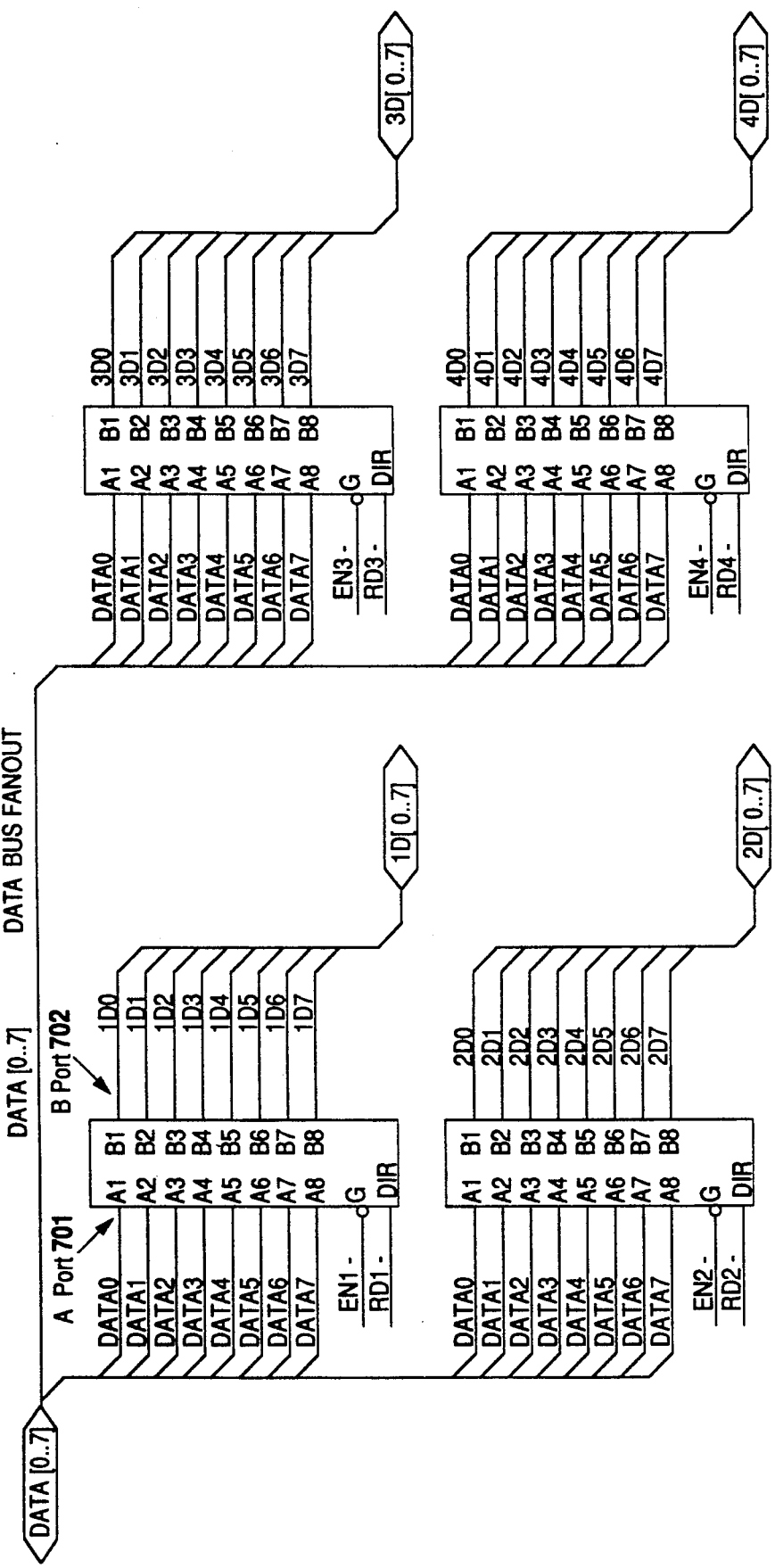
FIG. 7 is a detailed schematic of the data bus fanout circuitry 304 used in the circuit of FIG. 3.

Referring to FIG. 7, with respect to data going from I/O card 204 to SICC 305, data bus fanout 304 amplifies and divides the signals. With respect to data going from SICC 305 to I/O card 204, Data bus fanout 304 acts to prevent bus conflicts. Data bus fanout 304, for example, may be comprised of four Texas Instruments 74LS645 octal bus transceiver chips. Each transceiver has two ports, an A port 701 and a B port 702. The ports either send or receive data depending upon the logic level of the DIR (direction) line. A RD line (all RD lines are always at the same logic level whether /RDx or /xRD) is connected to the DIR terminal to assure that the direction of the transceiver chips is in since with the SICC circuit. The /EN signals which feed all the /G terminals, assure that only one transceiver chip is use at a time.

Data on A port 701 is either coming from or going to the I/O card 204. Each of the eight bits of data coming from the I/O card 204 connects to all four transceiver chips on the A port. Since only one transceiver chip can operate at a time, there can never be a bus conflict when data is being sent from a transceiver to the I/O card.

Data on port B is either coming from or going to a PIC chip. There are sixteen PIC chips and only four transceivers so each line connected to a B port 702 is also connected to 4 PIC chips. All eight B port 702 lines are connected to the same four PIC chips. Bus conflicts are prevented between the B ports 702 and the PIC chips using the /CS (chip select) lines. Each /EN (enable) line corresponds to four /CS lines, which corresponded to four PIC chips. Each transceiver chip fully corresponds to four particular PIC chips. Therefore, the /EN line that feeds a particular transceiver chip corresponds with the same PIC chips as does the transceiver chip.

Figure 8A:
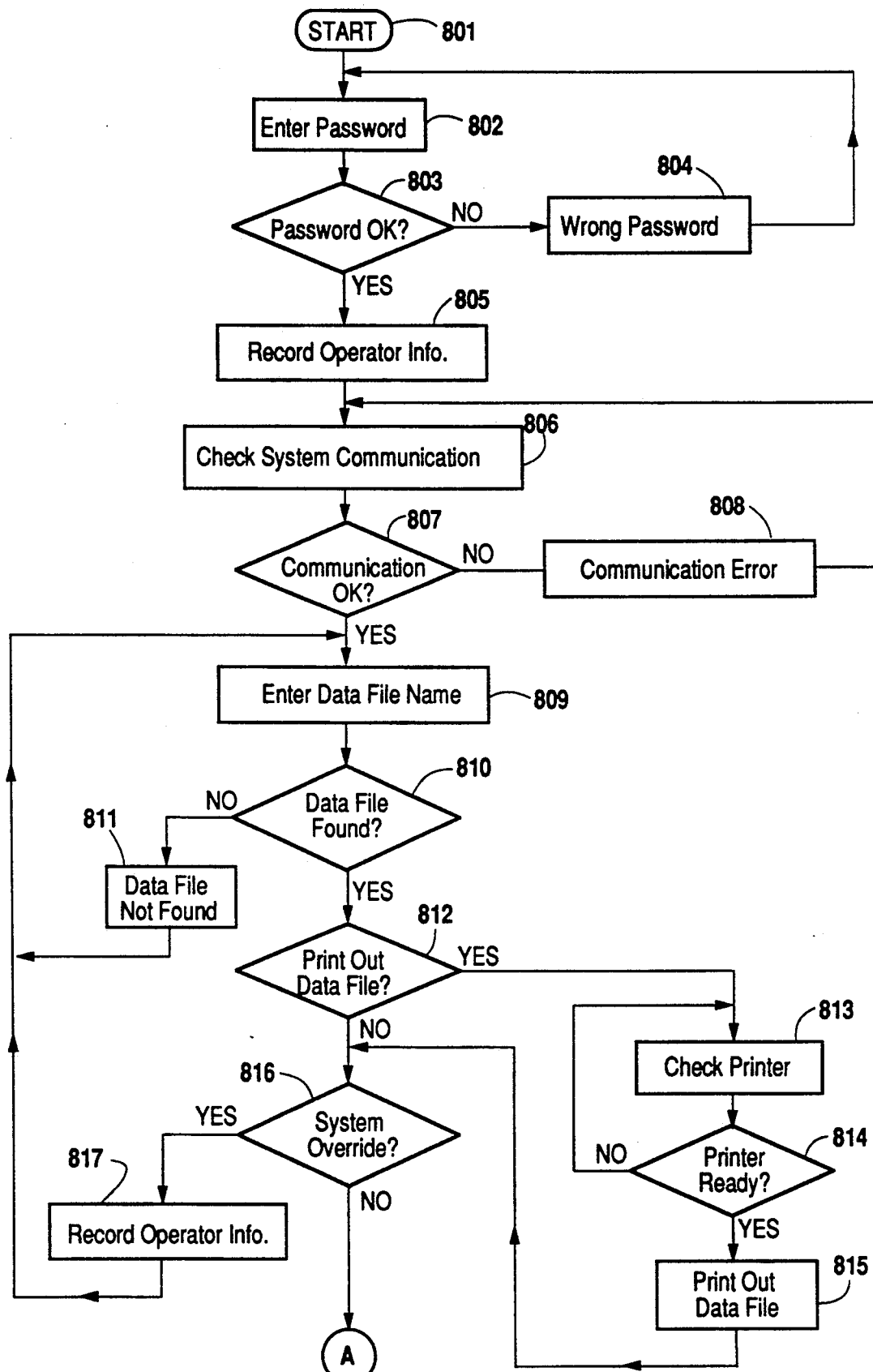
FIGS. 8A, 8B and 8C are flow charts of the method of operating the apparatus of FIG. 1 to perform the method of the present invention.
Figure 8B:
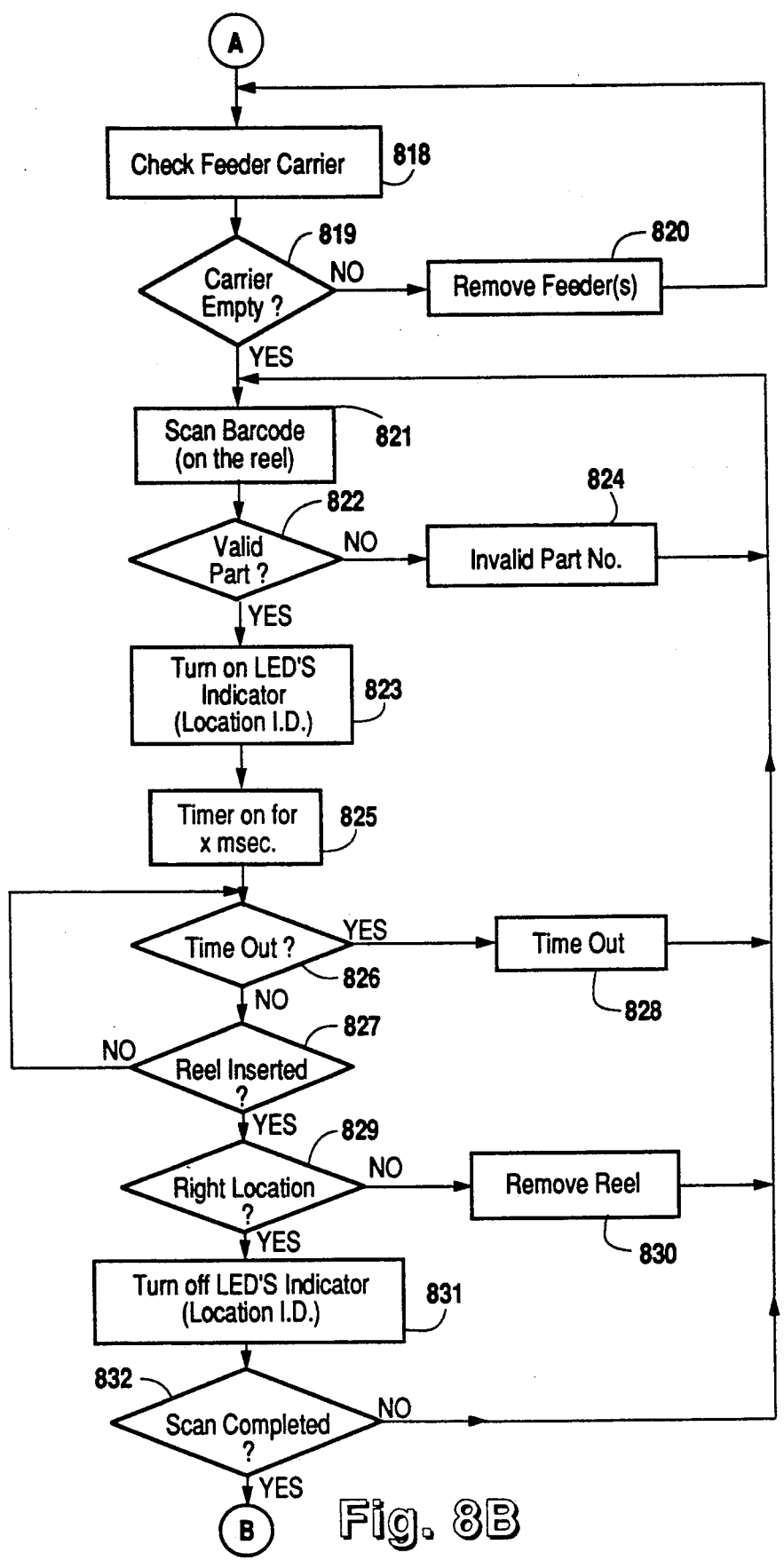
Figure 8C:
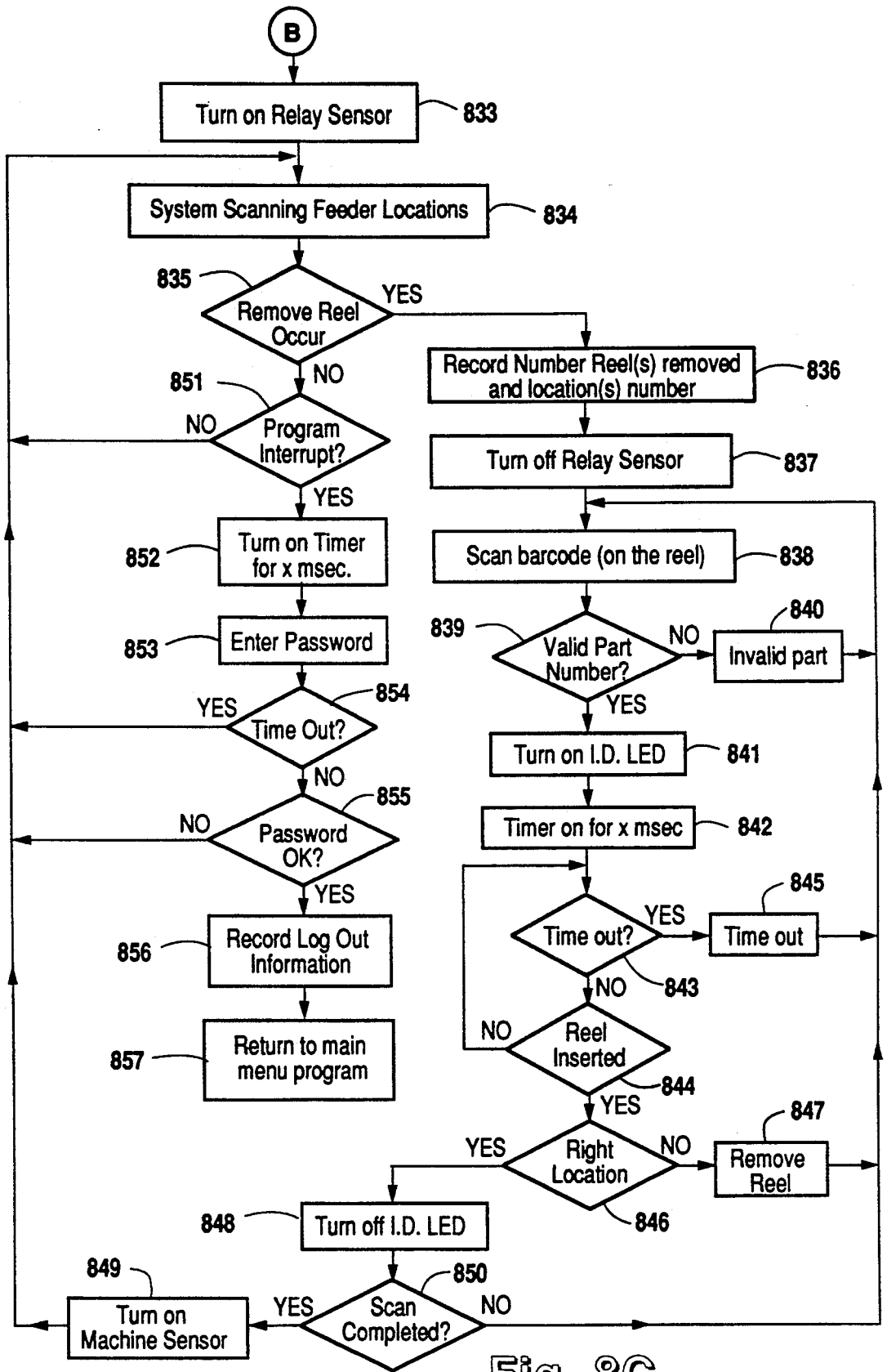

Referring to FIGS. 8A, 8B and 8C, presented is a flow chart displaying the method of operation of the present invention. The use of a rectangle in FIG. 8 signifies and action block, that is a task that must be accomplished at that point in the process. The use of a diamond in FIG. 8 signifies a decision region, that is a point in the process where the subsequent steps will vary according to a current choice or condition.

Oval 801 signifies the start of the assembly process. At the first step control is at the "enter password" block 802. At this point the machine operator is prompted to enter a password that will allow him access to the program and thereby the use of the assembly machine. After a password is entered control passes to the "Password OK" block 803. Here the computer must check the password entered at block 802 against a list of acceptable passwords. If the password is not found, the control reverts back to block 802 and awaits the entrance of another password. If the password is acceptable then control moves on to the "Record operator info" block 805 where the operator is prompted to enter information identifying himself personally. In conjunction with block 805 the computer stores the operator information, noting the time and date of use.

After operator information is entered, control moves on to the "Check system communication" block 806. Here the computer verifies communication with all necessary peripheral devices including the printer and checks for proper power supply voltage.

After checking all necessary communication links and noting any problems, control moves to "communication OK" decision block 807. If any of the communication links are not verified, an error message is displayed and control moves back to block 806. If no communication problems were detected then control moves forward.

After communications are verified, control passes to "enter data file name" block 809. Here, the operator is prompted to enter an indication of the product that is to be assembled. The computer then searches for a previously stored file that corresponds to the indicated product. The file may contain, for example, the part number and description of the product, and the numbers of the compartment numbers.

The computer notes if the file is not found then transfers control to "Data file found" decision block 810. At this decision region, if the indicated data file has not been found control will be transferred to "data file not found" block 811 and then immediately back to block 809 where the computer will await the entry of another product indication. If the indicated data file has been found decision block 810 will transfer control to "Print out Data file" block 812.

When control is at block 812, the operator will be prompted to indicate if a printout of the data file is desired. If not, control is passed to "system override" decision block 816. If, at block 812, the operator indicates yes, then control is transferred to "check printer" block 813. Here the computer checks if the printer is present and ready to print. After noting the status of the printer control is passed to "Printer ready" decision block 814. If block 813 did not find the printer ready then block 814 will give an error message and return control to block 813. If block 813 found the printer ready then block 814 will pass control to "print out data file" block 815 where the file will be printed. After the printing is complete control is automatically passed to "system override?" decision block 816.

At block 816 the operator is given an opportunity to override the system. Specifically, overriding the system allows the operator to load the assembly machine without interference from the invention. If, at block 816, the operator indicates yes, control will be passed to "record operator info" block 817 where operator information will again be recorded, which permits tracking of the cycle time of the assembly machine. After recording operator information at block 817, control will be passed far ahead to "system scanning feeder locations" block 834. If at block 816, the operator indicates "no" then control is passed to "check feeder carrier" block 818.

At block 818, the invention checks that all locations 107 are empty. It is preferred that this is accomplished by polling the compartment sensors 105. The compartment sensors are polled by reading data from the B bus 408 of all forty-eight OBTC chips 402. The software can initiate this polling by placing the proper signals at the I/O card 204.

Since all sixteen PIC chips 401, and all 48 OBTC chips 402 must be polled, the procedure will start at a predetermined point. For example the first OBTC chip 402 of the first interface circuit. Based on this selection the five control signals (RD-IN, WR-IN, A0-IN, A1-IN, SW RESET) and the binary coded decimal (A,B,C,D) must be generated and placed on the I/O card 204. With no relevance to order, the discussion will deal with chip select first.

To select the PIC chip 401 of the first interface circuit the computer generates on lines A, B, C, and D, the binary coded decimal zero. Referring to FIGS. 4, 6 and 7, use of the binary coded decimal zero would result in making /CS1 (chip select 1), and EN1 (enable 1) active. First PIC chip 401 is enabled as a result of CS1 becoming active. The first transceiver chip (that which corresponds to the first four PIC chips 401) is enabled as a result of /EN1 becoming active.

Once the correct PIC chip 401 has been enabled, an addressing signal must select PIC chip 401 port that corresponds to the OBTC chip 402 that corresponds to the selected compartment sensors 105. For this example, the status of the first eight compartment sensors 105 can be determined by reading the data from B bus 408 of the first OBTC chip 402 corresponding to the first PIC chip 401. This addressing is accomplished using lines A0-IN and A1-IN which originate at I/O card 204 and correspond with signals A0 and A1 present at every PIC chip 401. If A0-IN and A1-IN are both at logic low then after fanout and amplification A0 and A1 will also be at logic low and PIC chip 401 will be configured to transfer data from A port 404 to D data port 401.

Referring also to FIG. 3, the computer must also place, on I/O card 204, the correct RD-IN (read) and WR-IN (write) signals to configure the data bus fanout circuit 304 and SICC 305 for movement of data from the compartment sensors 105 to the I/O card 204. Since the current operation involves "reading" data from the peripherals, RD-IN is made active and WR-IN is made inactive. After fanout and amplification the RD signals will configure the OBTC chip 402 and the transceiver chip 703 for movement of data toward the I/O card 204. The combination of the RD and WR signals will similarly configure the PIC chip 401.

After all addressing, enabling and chip selection is complete, the indicated eight bits of data will arrive at the I/O card 204 where they can be accessed directly by the computer. If any bits indicate that a sensor 105 is active (i.e. that a compartment 106 is present), that location is stored. This process continues until all three hundred and eighty-four bits have been retrieved eight at a time. Continuing the process requires only the changing of addressing and chip select signals such that each OBTC chip 402 of each PIC chip 401 is polled.

Referring again to FIG. 8B, after all compartment sensors are polled control is transferred to "Carrier Empty" decision block 819. If no compartment sensors 105 were found active then control shifts to "scan barcode" block 821. If any compartment sensors 105 were found active then control shifts the "Remove feeders" block 820. The operator is prompted to remove any compartments 106 from any locations 107 and after response from the operator, control shifts back to block 818 where the compartments sensors 105 are polled again. Control then shifts to block 819 and the loop 819 to 820 to 818 continues until no compartment sensors 105 are found active. Once it is determined that all compartment sensors 105 are inactive, control shifts to "Scan Barcode" block 821.

At block 821 the operator is prompted to use component identifier 103 to read indicia 110 from a compartment 106. In a preferred embodiment, component identifier 103 is a bar code reader (connected to the computer's serial port or keyboard) reading a bar code from a reel of electronic components. The indicia 110 is read and stored then control shifts to "valid part?" block 822. Here the part is compared against a list of parts for the current product of manufacture. If the stored part number is found on the list then control shifts to "Turn on Led indicator" block 823. If the part is not found, then control shifts to block 824 where the user is alerted that the part is not valid. Control then shifts back to block 821 for the identification of another compartment 106. This process continues until a valid part is identified at which time control shifts to block 823.

At block 823 the computer indicates the correct location 107 of the identified components 104. The computer will possess the correct information, having obtained it from a pre-stored index of valid part numbers. In order to make a position indicator 102 active the computer completes an operation opposite of that accomplished when polling the compartment sensors 105.

This merely involves making the proper signals available at the I/O card 204.

For example, assume the identified component belongs in the second location of the third OBTC chip 402 of the fourth PIC chip 403 (fourth PIC chip 401 means fourth interface circuit). To select the PIC chip 401 of the fourth interface circuit, the computer generates binary coded decimal three (three corresponds with four because the binary count begins at zero and the decimal count begins at 1). Therefore, Binary coded decimal D, C, B, A must be coded as 0, 0, 1, 1. Referring also to FIGS. 4, 6 and 7 use of the binary coded decimal three results in making /CS4 (chip select 4), and /EN1 (enable 1) active. The fourth PIC chip 401 is enabled as a result of /CS4 becoming active. The first transceiver chip (that which corresponds to the first four PIC chips 401) is enabled as a result of /EN1 becoming active.

Once the correct PIC chip 401 has been enabled, an addressing signal must select the PIC chip 401 port that corresponds to the OBTC chip 402 that corresponds to the selected position indicator 102. For this example, an eight bit data word must be written to the B bus 408 of the third OBTC chip 402 corresponding to the fourth PIC chip 401. This addressing is accomplished using lines A0-IN and A1-IN which originate at I/O card 204 and correspond with signals A0 and A1 present at every PIC chip 401. If A0-IN is at logic low and A1-IN is at logic high then after fanout and amplification A0 and A1 will equal low and high respectively and PIC chip 401 will be configured to transfer data from D data port 401 to C port 405.

Referring again to FIG. 3, the computer must also place, on I/O card 204, the correct RD-IN (read) and WR-IN (write) signals to configure the data bus fanout circuit 304 and SICC 305 for movement of data from the I/O card 204 to the position indicators 102. Since the current operation involves "writing" data from the peripherals, WR-IN is made active and /RD-IN is made inactive. After fanout and amplification the RD signals will configure the OBTC chip 402 and the transceiver chip 703 for movement of data toward the peripherals. The combination of the /RD and /WR signals will similarly configure the PIC chip 401.

After all addressing, enabling and chip selection is complete, the computer causes the correct eight bits of data to appear on the I/O card 204. Since the second location is desired the data stream should have all bits inactive except for the second bit which should be active. After the data is sent the selected location will indicate until new data is sent which makes the second bit inactive.

After the proper position indicator 102 is activated, control switches to "timer" block 825. Here, a timer count is begun, noting the elapsed time since the position indicator 102 was activated. Control then moves control to "time out" decision block 826. Here, the computer determines how much time has elapsed and if it is in excess of a predetermined amount then control shifts to "time out" block 828. The operator is alerted that the loading time has elapsed and control is shifted back to block 821 where the operator must identify the compartment 106 again.

If at block 826, it is determined that the predetermined amount of time has not elapsed then control shifts to "reel inserted" block 827. Here the computer polls the compartment sensors 105 to determine if any compartments 106 have been loaded since the activation of the position indicator 102. If no compartment 106 has been loaded then control shifts back to block 826 where the elapsed time is checked again. This process continues until a compartment 106 is loaded within the allowed time.

Going back to block 827, if a poll of compartment sensors 105 finds that a compartment 106 has been inserted then control moves forward to "right location" decision block 849. Here the computer compares the location at which the new compartment was found with the location that was indicated by the position indicator 102. If the locations are different then control is moved to "remove reel" block 830 and the operator is told to remove the compartment 106 that was just loaded. A polling will occur to verify removal of the compartment and after it is removed control is shifted back to block 821 where the compartment identification process will begin over again. If, at block 827, it is determined that the indicated location 107 is the same location 107 where a compartment 106 has been found, then an indicia of the loaded compartment is stored in memory and control moves to "turn off Led indicator" block 831. Here, in a manner described above, the computer sends a data word to deactivate the activated position indicator 102.

After a position indicator 102 is deactivated control moves forward to "scan completed" decision block 832. Here the computer checks to determine if all compartments 106 necessary for the selected product have been loaded. This check can be accomplished by actual polling of the compartment sensors 105 and comparing those found with a pre-existing list of those which should be there. It can also be accomplished by comparing the same preexisting list with a compilation of the compartments 106 which have already been correctly loaded. In either case, if at block 832, it is determined that the loading of the assembly machine is incomplete, then control shifts back to block 821 where another compartment 106 is drawn into the process. If at block 832, it is determined that all necessary compartments are present then control moves forward to "turn on relay sensor" block 833. Here, the computer sends a signal, through I/O card 204, to a relay which enables the assembly machine. At this point the assembly machine is ready to operate.

Once the assembly machine is enabled control shifts to "system scanning feeder locations" block 834. Here, in a manner described above, the computer polls the compartment sensors 105 to assure that all necessary compartments 106 are still present. If any necessary compartment is missing, its identity is stored. However, whether all compartments 106 are present or not, control moves forward to "remove reel occur" decision block 835. If all compartments 106 were found present (none removed) then control again moves forward to "program interrupt" block 851

In block 851, program interrupt is allowed in cases where an operator desires to modify data or transfer or receive information from a floppy disk, or other storage device. If block 851 determines that interrupt is desired, control is transferred to block 852 where the internal software timer is activated responsive to the depressing of any key on the key board. Control is then transferred to block 853 wherein the computer awaits the entry by the operator of an appropriate password. Unless the appropriate password is entered before the expiration of the timer, started in block 852, as determined by decision block 854, control is returned to block 834.

If, on the other hand, a password is entered within the prescribed time limit, control passes to decision block 855 wherein the validity of the password is tested. If the password is not valid, control returns to block 834, if, on the other hand, the password is valid, control passes to blocks 856 wherein logout user information is recorded such as, for example, operator name, date, time of time, and the like. Then, in block 857, control is returned to the main program menu to allow the operator to modify data or transfer or receive information from the floppy disk, and similar operations.

If at block 835, it is determined that a necessary compartment 106 is missing (a compartment 106 has been removed), then control shifts to "Record number reel removed and location number" block 836. Here, as the name indicates, the identity of the all missing compartments and their proper locations are recorded and control is moved forward to "turn off relay sensor" block 837. Since a necessary component 104 is unavailable, the computer 202 prompts the relay 205 to disable the assembly machine 101. Control then shifts to "scan barcode" block 838 where the computer 202 prompts the operator to scan a compartment 106 to substitute for the one missing.

After scanning and storing the indicia 110 control shifts to "valid part number" decision block 839. If the part is not one of those found missing then control shifts to "invalid part" block 840. Here, the operator is prompted as to the invalid part and control is moved back to block 838 where another compartment 106 can be identified. If at block 839, it is determined that the identified compartment 106 is indeed an acceptable replacement for one of the missing compartments then control moves to "turn on Led" block 841. Here, in a manner described above, the computer activates the position indicator 102 which corresponds to the correct location 107 of the identified compartment 106.

After the proper position indicator 102 is activated, control switches to "timer" block 842. Here, a timer count is begun, noting the elapsed time since the position indicator 102 was activated. Control then moves control to "time out" decision block 843. Here, the computer determines how much time has elapsed and if it is in excess of a predetermined amount then control shifts to "time out" block 845. The operator is alerted that the loading time has elapsed and control is shifted back to block 838 where the operator must identify the compartment 106 again.

If at block 843, it is determined that the predetermined amount of time has not elapsed then control shifts to "reel inserted" block 844. Here the computer polls the compartment sensors 105 to determine if any compartments 106 have been placed since the activation of the position indicator 102. If no compartment 106 has been loaded then control shifts back to block 843 where the elapsed time is checked again. This process continues until a compartment 106 is loaded within the allowed time.

Going back to block 844, if a poll of compartment sensors 105 finds that a compartment 106 has been inserted then control moves forward to "right location" decision block 846. Here the computer compares the location at which the new compartment was found with the location that was indicated by the position indicator 102. If the locations are different then control is moved to "remove reel" block 847 and the operator is told to remove the compartment 106 that was just loaded. A polling will occur to verify removal of the compartment and after it is removed control is shifted back to block 838 where the compartment identification process will begin over again. If, at block 846, it is determined that the indicated location 107 is the same location 107 where a compartment 106 has been found, then an indicia of the loaded compartment is stored in memory and control moves to "turn off Led indicator" block 848. Here, in a manner described above, the computer sends a data word to deactivate the activated position indicator 102.

After a position indicator 102 is deactivated control moves forward to "scan completed" decision block 850. Here the computer checks to determine if all compartments 106 necessary for the selected product are present. This check can be accomplished by actual polling of the compartment sensors 105 and comparing those found with a pre-existing list of those which should be there. It can also be accomplished by comparing the same pre-existing list with a compilation of the compartments 106 which have already been correctly loaded. In either case, if at block 850, it is determined that the loading of the assembly machine is incomplete, then control shifts back to block 838 where another compartment 106 is drawn into the process. If at block 850, it is determined that all necessary compartments are present then control moves forward to "turn on relay sensor" block 849. Here, the computer sends a signal, through I/O card 204, to a relay which enables the assembly machine. At this point the assembly machine is ready to operate again and control is shifted back to block 834.

Although the present invention has been described with reference to particular preferred embodiments, it will be understood by those of skill in the art that additions, deletions or changes could be made to the disclosed embodiment without departing from the scope of the invention.

What is claimed is:

1. A system for assembling multiple component products, comprising:
   an assembly machine which assembles products using components retrieved from a plurality of compartments located at a corresponding plurality of locations, each compartment located according to a type of component stored within;
   a component identifier that identifies the type of component stored in each compartment by analyzing indicia of the components or component compartments; and
   at least one location indicator, responsive to the component identifier, for producing an indication signal of the corresponding location of each component compartment or component after the type of component has been identified.

2. The system of claim further comprising, at least one compartment sensor that senses whether a compartment is present in a previously identified location.

3. The system of claim 1, further comprising, an error indicator that indicates if a compartment has not been placed in a corresponding location indicated by the location indicator.

4. The system of claim 3, said error indicator indicating if a compartment has not been placed in said corresponding location indicated by the location indicator within a predetermined amount of time.

5. The system of claim 4, said predetermined amount of time been selected to correspond to a time required to load the compartment in said corresponding location.

6. The system of claim 1, further comprising, a disabling device which disables said assembly machine at the beginning of a machine loading time period, and which enables said assembly machine after all compartments are placed in their corresponding locations.

7. The system of claim 1 further comprising, a disabling device that disables said assembly machine, after loading of said machine has been completed, if any compartment is removed from a location, and that enables said machine once all emptied locations have been filled with corresponding compartments.

8. The system of claim 1, wherein the component identifier comprises an optical reader.

9. The system of claim 8, wherein the indicia of the components or compartments comprises optically readable indicia.

10. The system of claim 9, wherein the optically readable indicia is a bar code.

11. The system of claim wherein the location indicator comprises an individual visual indicators corresponding to each location.

12. The system of claim 11, wherein said visual indicators comprise light emitting diodes.

13. A system for assembling multiple component products, comprising:
- a machine which assembles products using components retrieved from a plurality of compartments, each compartment being located in a corresponding one of a plurality of locations according to a type of component stored within each compartment;
- an information processor;
- a component identifier, connected to the information processor, that identifies a type of component stored in a compartment, said information processor operating to determine a proper location of each identified compartment; and
- at least one location indicator, connected to and controlled by the information processor, that indicates the proper location of each identified compartment.

14. The system of claim 13, further comprising at least one compartment sensor that senses whether a compartment is present in a previously identified location.

15. The system of claim 13, further comprising one compartment sensor per location.

16. The system of claim 13, further comprising an error indicator which indicates if a compartment has not been placed in a location indicated by the location indicator.

17. The system of claim 16, said error indicator indicating if a compartment has not been placed in a location indicated by the location indicator within a predetermined period.

18. The system of claim 17, said predetermined time period being selected to correspond to a time required to load a compartment in a corresponding location.

19. The system of claim 13, further comprising a disabling device that disables said assembly machine at the beginning of a loading operation, and that enables said assembly machine after all compartments are placed n corresponding locations.

20. The system of claim 13 further comprising a disabling device that disables said assembly machine, after proper loading of said machine is complete, if any compartment is removed from a location, and that enables said assembly machine once all emptied locations have been filled with corresponding compartments.

21. The system of claim 13, wherein the component identifier comprises an optical reader.

22. The system of claim 21, wherein the indicia of the components or compartments comprises optically readable indicia.

23. The system of claim 22, wherein the optically readable indicia comprises a bar code.

24. The system of claim 13, wherein the location indicator comprises an individual visual indicator corresponding to each location.

25. The invention of claim 24, wherein said visual indicator comprises a light emitting diode.

26. The system of claim 13, wherein the assembly machine comprises:
- a pick and place machine; and
- a tape and reel feeding system.

27. The system of claim 13, where the information processor comprises:
- a computer with memory; and
- a digital I/O circuit that facilitates communication between the computer and the component identifier and the location indicators.

28. The system of claim 27, further comprising a relay circuit connected to and controlled by the computer, for disabling the assembly machine if all locations are not loaded with compartments containing the correct type of component.

* * * * *